United States Patent
Weber (10) Patent No.: US 7,401,515 B2
(45) Date of Patent: Jul. 22, 2008

(54) ADAPTIVE CIRCUITS AND METHODS FOR REDUCING VIBRATION OR SHOCK INDUCED ERRORS IN INERTIAL SENSORS

(75) Inventor: Mark W. Weber, Zimmerman, MN (US)

(73) Assignee: Honeywell International Inc., Morristown, NJ (US)

(*) Notice: Subject to any disclaimer, the term of this patent is extended or adjusted under 35 U.S.C. 154(b) by 114 days.

(21) Appl. No.: 11/277,686

(22) Filed: Mar. 28, 2006

(65) Prior Publication Data
US 2007/0227247 A1    Oct. 4, 2007

(51) Int. Cl.
G01P 9/04    (2006.01)

(52) U.S. Cl. ................. 73/504.12; 73/504.12

(58) Field of Classification Search ............. 73/504.02, 73/504.04, 504.12, 504.14, 504.15, 504.16
See application file for complete search history.

(56) References Cited

U.S. PATENT DOCUMENTS

| | | | |
|---|---|---|---|
| 4,694,696 A | 9/1987 | Hojo et al. | |
| 5,463,233 A | 10/1995 | Norling | |
| 5,672,949 A * | 9/1997 | Ward | 318/609 |
| 5,892,153 A | 4/1999 | Weinberg et al. | |
| 6,079,272 A | 6/2000 | Stell et al. | |
| 6,114,794 A | 9/2000 | Dhuler et al. | |
| 6,164,134 A | 12/2000 | Cargille | |
| 6,262,512 B1 | 7/2001 | Mahadevan | |
| 6,275,320 B1 | 8/2001 | Dhuler et al. | |
| 6,307,202 B1 | 10/2001 | Manalis et al. | |
| 6,327,909 B1 | 12/2001 | Hung et al. | |
| 6,360,601 B1 | 3/2002 | Challoner et al. | |
| 6,467,346 B1 | 10/2002 | Challoner et al. | |
| 6,498,996 B1 | 12/2002 | Vallot | |
| 6,598,475 B2 | 7/2003 | Pinson | |
| 6,653,239 B2 | 11/2003 | Lebouitz | |
| 6,768,412 B2 | 7/2004 | Becka et al. | |
| 6,837,108 B2 | 1/2005 | Platt | |
| 6,900,702 B2 | 5/2005 | Youngner et al. | |
| 2002/0135414 A1 | 9/2002 | McCall et al. | |
| 2005/0104693 A1 | 5/2005 | Youngner | |
| 2005/0133479 A1 | 6/2005 | Youngner et al. | |

* cited by examiner

Primary Examiner—Helen C. Kwok (57) ABSTRACT

Adaptive circuits and methods for reducing vibration-induced bias errors in inertial sensors. An adaptive circuit for reducing vibration or shock induced errors in an inertial sensor having a proof mass and sense electrode may include a sense bias voltage source, a charge amplifier, a device for detecting and/or anticipating an external vibration or shock on the inertial sensor, and a device for selectively dampening the proof masses and/or adjusting the gain sensitivity of the charge amplifier in response to an external vibration or shock on the inertial sensor. A dampening resistive element may be provided to dampen the proof mass motion in response to an external vibration or shock on the inertial sensor. Alternatively, or in addition, the gain sensitivity of the rate signal outputted by the charge amplifier can be adjusted in response to an external vibration or shock on the inertial sensor. During operation, the dampening and/or gain sensitivity can be adjusted to prevent signal saturation or clipping from occurring in the sense electronics, allowing the inertial sensor to continue functioning during periods of vibration or shock.

13 Claims, 11 Drawing Sheets

ADAPTIVE CIRCUITS AND METHODS FOR REDUCING VIBRATION OR SHOCK INDUCED ERRORS IN INERTIAL SENSORS

GOVERNMENT SUPPORT

This invention was made with government support under US Army TACOM-ARDEC contract number DAAE30-01-9-0100. The government may have certain rights in the invention.

FIELD

The present invention relates generally to the field of inertial sensors. More specifically, the present invention pertains to adaptive circuits and methods for reducing vibration induced errors in inertial sensors.

BACKGROUND

Microelectromechanical system (MEMS) gyroscopic devices are utilized in a variety of applications for sensing inertial motion in one or more dimensions. Such devices are particularly useful in applications demanding a high degree of reliability and accuracy where it may be necessary to measure and/or detect small changes in motion or acceleration, or where size and/or weight are important design considerations. In the design of navigational and communications systems, for example, such devices are useful in measuring and/or detecting slight variations in linear and rotational motion of an object traveling through space. Because such devices can be manufactured using batch semiconductor fabrication techniques, greater tolerances and reliability can be achieved in comparison to more traditional fabrication techniques.

The design of MEMS-type gyroscopes varies greatly depending on their particular purpose. Rate gyroscopes, for example, are often used to determine the rate of rotation of a moving object by generating and measuring Coriolis forces. In a vibratory-type rate gyroscope, for example, a drive system including one or more proof masses can be configured to oscillate back and forth relative to a motor pickoff comb in a drive plane orthogonal to the input axis, or "rate axis," in which motion is to be determined. The proof masses may each include a number of interdigitated comb fingers configured to move relative to each other when electrostatically charged with a time-varying signal from a drive voltage source. A number of suspension springs or other flexural elements are typically used to constrain motion of each proof mass in a particular direction above an underlying support substrate.

A sense electrode or other sensing means disposed on the substrate adjacent to and parallel with each proof mass can be charged with a sense bias voltage. As each proof mass moves back and forth above the substrate, the Coriolis force resulting from conservation of momentum of the moving body as it rotates about the input axis causes the spacing between each proof mass and sense electrode to vary, resulting in a concomitant change in capacitance. By measuring the capacitance between the proof mass and sense electrodes, a measure of the rotational motion and/or acceleration of the moving body can be ascertained.

MEMS gyroscopes are often utilized in harsh mechanical environments that can degrade their performance. In some navigational applications, for example, such devices may be used as part of an inertial sensor to sense and measure rotation of an aircraft, missile, or other moving object in which environmental factors such as vibration and/or shock are often present. An example of such vibration and/or shock may result, for example, from the deployment of the canards used in some aircraft or missiles for stabilization, which can cause a momentary shock that temporarily affects the sensor output. Where relatively significant external vibration is present, the charge amplifier used by some inertial sensors to measure rate can become overwhelmed due to the relatively large sensor output, causing the amplifier to temporarily clip and output a null rate signal. In other cases, the vibration or shock within the environment may cause the inertial sensor to output a saturated signal that inaccurately reflects the true rotation of the sensor. Because many conventional inertial sensing devices are unable to adaptively compensate for these vibrations or shocks within the environment, the ability of these devices to accurately detect and measure subtle changes in motion or acceleration may be compromised in some circumstances.

SUMMARY

The present invention pertains to adaptive circuits and methods for reducing vibration or shock induced errors in inertial sensors. The adaptive circuits and methods discussed herein are applicable to a wide variety of inertial sensors susceptible to vibration or shock induced errors. In some embodiments, for example, the adaptive circuits and methods discussed herein can be utilized to reduce errors in a MEMS-type rate gyroscope employing a number of vibrating proof masses and stationary sense electrodes to sense Coriolis forces resulting from rotational motion of the gyroscope about a rate axis. It should be understood, however, that the adaptive circuits and methods discussed herein can be utilized in other types of inertial sensors, if desired.

An adaptive circuit in accordance with an illustrative embodiment can include a sense bias voltage source electrically connected to a sense electrode and adapted to produce a charge on a corresponding proof mass, an amplifier electrically connected to each proof mass and adapted to output a rate signal based at least in part on the charge produced on the proof mass, a means for detecting and/or anticipating an external vibration or shock on the inertial sensor, and a means for selectively dampening the proof mass motion and/or adjusting the gain sensitivity of the amplifier in response to an external vibration or shock on the inertial sensor.

In some embodiments, a dampening resistive element such as a fixed or variable resistor can be utilized to dampen proof mass motion during periods of vibration or shock in order to prevent signal saturation of the rate signal. The dampening resistive element may be disposed in series between each proof mass and the amplifier. Alternatively, or in addition, the dampening resistive element may be disposed in series between each sense electrode and the sense bias voltage source. During operation, the dampening resistive element can be configured to absorb proof mass energy caused by the vibration or shock, thus preventing signal saturation of the sensing electronics. Dampening of the proof mass motion can occur, for example, when an external vibration or shock is detected and/or when external vibration or shock is anticipated to occur.

The reduction of vibration or shock induced errors in the inertial sensor can be further accomplished in some embodiments by adjusting the gain sensitivity of the amplifier used by the sense electronics to measure gyroscopic rate. In some embodiments, for example, the gain sensitivity can be adjusted by switching between multiple feedback capacitors to either increase or decrease signal gain of the amplifier depending on the amount of vibration or shock present within the environment. In other embodiments, multiple charge amplifiers, or, alternatively, a single charge amplifier having multiple channels can be configured to output multiple rate signals that can be used to instantaneously adjust the gain sensitivity during periods of vibration or shock.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized. While the various examples provided herein discuss reducing vibration or shock induced errors in MEMS-type rate gyroscopes, it should be understood that the adaptive circuits and methods discussed herein can be utilized in other types of sensors susceptible to such vibration or shock related errors.

Figure 1:
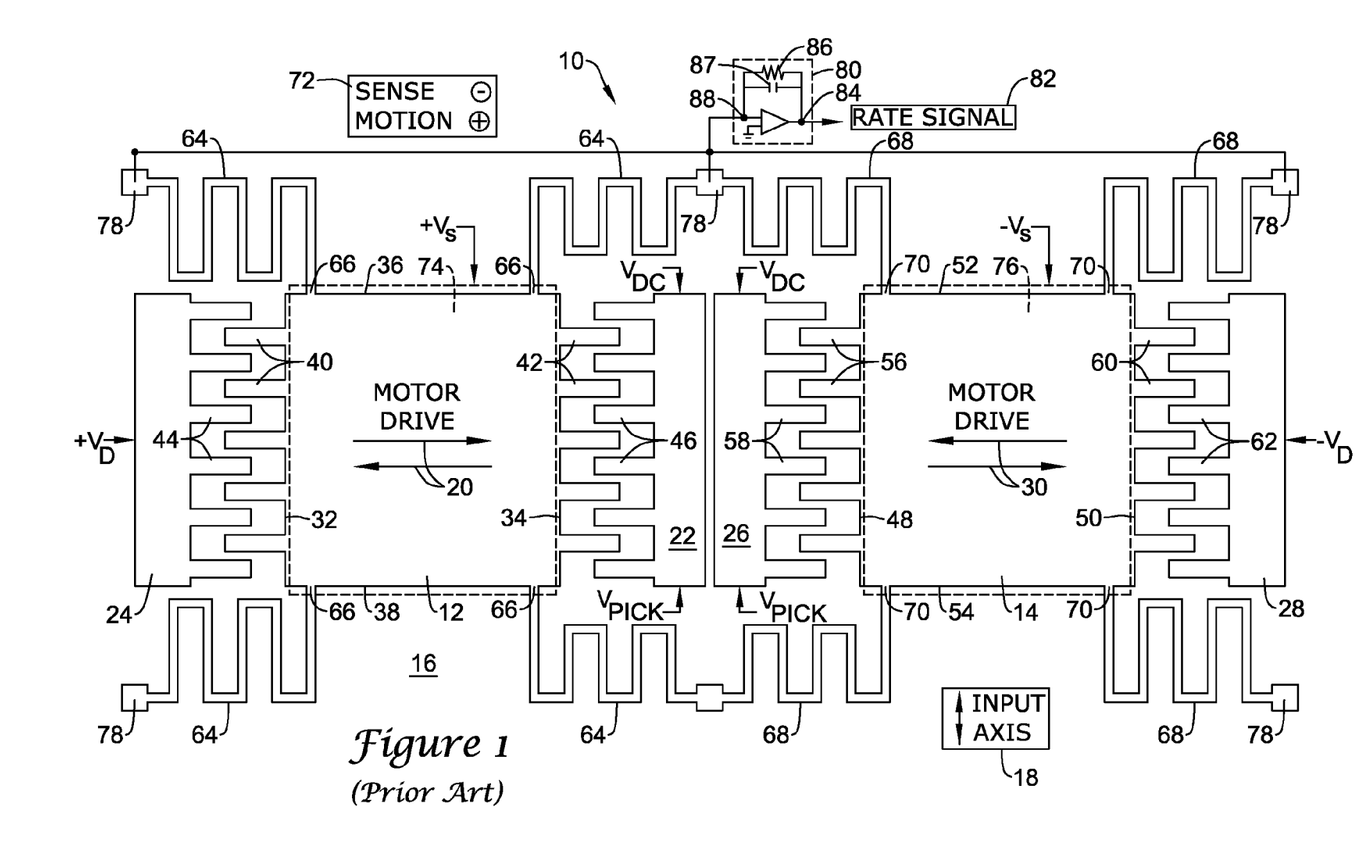
FIG. 1 is a schematic view of an illustrative MEMS-type rate gyroscope.

Referring now to FIG. 1, a schematic view of a MEMS-type gyroscope 10 will now be described. Gyroscope 10, illustratively a vibratory rate gyroscope, includes a first proof mass 12 and second proof mass 14, each of which are adapted to oscillate back and forth above an underlying support substrate 16 in a drive plane orthogonal to an input axis 18 of the gyroscope in which inertial motion is to be determined. As indicated generally by the right/left set of arrows 20, the first proof mass 12 can be configured to oscillate back and forth above the support substrate 16 between a first motor pickoff comb 22 and first drive electrode 24, both of which remain stationary above the support substrate 16 to limit movement of the first proof mass 12. The second proof mass 14, in turn, can be configured to oscillate back and forth above the support substrate 16 in a similar manner between a second motor pickoff comb 26 and second drive electrode 28, but 180 degrees out-of-phase with the first proof mass 12, as indicated generally by the left/right set of arrows 30.

The first proof mass 12 can include a thin plate or other suitable structure having a first end 32, a second end 34, a first side 36, and a second side 38. Extending outwardly from each end 32,34 of the first proof mass 12 are a number of comb fingers 40,42 used to electrostatically drive the first proof mass 12 in the direction indicated by the right/left set of arrows 20. In the illustrative gyroscope 10 depicted in FIG. 1, for example, a first set of comb fingers 40 extending outwardly from the first end 32 of the first proof mass 12 can be interdigitated with a corresponding set of comb drive fingers 44 formed on the first drive electrode 24. A second set of comb fingers 42 extending outwardly from the second end 34 of the first proof mass 12, in turn, can be interdigitated with a corresponding set of comb fingers 46 formed on the first motor pickoff comb 22.

The second proof mass 14 can be configured similar to the first proof mass 12, having a first end 48, a second end 50, a first side 52, and a second side 54. A first set of comb fingers 56 extending outwardly from the first end 48 of the second proof mass 16 can be interdigitated with a corresponding set of comb fingers 58 formed on the second motor pickoff comb 26. A second set of comb fingers 60 extending outwardly from the second end 50 of the second proof mass 14, in turn, can be interdigitated with a corresponding set of comb fingers 62 formed on the second drive electrode 28.

The first and second proof masses 12,14 can be constrained in one or more directions above the underlying support structure 16 using one or more suspension springs. As shown in FIG. 1, for example, the first proof mass 12 can be anchored or otherwise coupled to the support substrate 16 using a first set of four suspension springs 64, which can be connected at each end 66 to the four corners of the first proof mass 12. In similar fashion, the second proof mass 14 can be anchored to the underlying support substrate 16 using a second set of four springs 68, which can be connected at each end 70 to the four corners of the second proof mass 14. In use, the suspension springs 64,68 can be configured to isolate oscillatory movement of the first and second proof masses 12,14 to the direction indicated generally by the right/left set of arrows 20,30 to reduce undesired perpendicular motion in the direction of the input axis 18, and to reduce quadrature motion in the direction of the sensing motion 72. In addition to supporting the proof masses 12,14 above the support substrate 16, the suspension springs 64,68 can also be configured to provide a restorative force when the drive voltage signal passes through the zero point during each actuation cycle.

A drive voltage $V_D$ can be applied to the first and second drive electrodes 24,28, producing an electrostatic force between the interdigitated comb fingers that causes the comb fingers to electrostatically move with respect to each other. The drive voltage $V_D$ can be configured to output a time-varying voltage signal to alternate the charge delivered to the comb fingers, which in conjunction with the suspension springs 64,68, causes the first and second proof masses 12,14 to oscillate back and forth in a particular manner above the support substrate 16. Typically, the drive voltage $V_D$ will have a frequency that corresponds with the resonant frequency of the first and second proof masses 12,14, although other desired drive frequencies can be employed, if desired.

A pair of sense electrodes 74,76 can be provided as part of the sensing system to detect and measure the out-of-plane deflection of the first and second proof masses 12,14 in the sense motion direction 72 as a result of gyroscopic movement about the input axis 18. As shown by the dashed lines in FIG. 1, the sense electrodes 74,76 can include a thin, rectangular-shaped electrode plate positioned underneath the proof masses 12,14 and oriented in a manner such that an upper face of each sense electrode 74,76 is positioned vertically adjacent to and parallel with the underside of the respective proof mass 12,14. The sense electrodes 74,76 can be configured in size and shape to minimize electrical interference with the surrounding comb fingers 40,42,56,60 to prevent leakage of the drive voltage source $V_D$ into the sense signal.

A sense bias voltage $V_S$ applied to each of the sense electrodes 74,76 can be utilized to induce a charge on the first and second proof masses 12,14 proportional to the capacitance between the respective sense electrode 74,76 and proof mass 12,14. The sense electrode 74,76 can be formed from a suitable material such as silicon that is electrically conductive with the material used to form the first and second proof masses 12,14 (e.g. a silicon-doped conductor), allowing the charge produced on the sense electrode 74,76 vis-á-vis the sense bias voltage $V_S$ to be transmitted to the proof mass 12,14.

During use, the Coriolis force resulting from rotational motion of the gyroscope 10 about the input axis 18 causes the first and second proof masses 12,14 to move out-of-plane with respect to the sense electrodes 74,76. When this occurs, the change in spacing between the each respective sense electrode 74,76 and proof mass 12,14 induces a change in the capacitance between the sense electrode 74,76 and proof mass 12,14, which can be measured as a charge on the proof masses 12,14. The resultant charge received on the proof mass 12,14 is then fed as a sense signal through the various suspension springs 64,68 to a number of leads 78. The leads 78, in turn, can be electrically connected to a charge amplifier 80 that converts the charge signals, or currents, received from the first and second proof masses 12,14 into a corresponding rate signal 82 that is indicative of the Coriolis force.

To help balance the input to the charge amplifier 80 at or about zero, the sense bias voltage $V_S$ applied to the first proof mass 12 can have a polarity opposite that of the sense bias voltage $V_S$ applied to the second proof mass 14. In certain designs, for example, a sense bias voltage $V_S$ of +5V and −5V, respectively, can be applied to each of the sense electrodes 74,76 to prevent an imbalance current from flowing into the output node 84 of the charge amplifier 80. To maintain the charge induced on the proof masses 12,14 at virtual ground, a relatively large value resistor 86 and capacitor 87 can be connected across the output 84 and input nodes 88 of the charge amplifier 80, if desired.

A motor pickoff bias voltage VDC can be provided across the first and second motor pickoff combs 22,26 to detect and/or measure displacement of the proof masses 12,14 induced via the drive voltage source $V_D$. In some cases, the biases on the two motor pickoff combs 22,26 may be of opposite signs. A motor pickoff voltage $V_{PICK}$ resulting from movement of the comb fingers 42,56 on the first and second proof masses 12,14 relative to the comb fingers 46,58 on the first and second motor pickoff combs 22,26 can be used to detect motion of the first and second proof masses 12,14.

During operation of the gyroscope 10, an external shock or vibration within the environment can cause undesired movement of the first and second proof masses 12,14 in the direction of the sense motion 72, causing the rate signal 82 outputted by the charge amplifier 80 to include both the desired rate signal component due to the Coriolis-induced forces exerted on the proof masses 12,14 along with an undesired signal component due to the external vibration or shock on the proof masses 12,14. In some cases, the external vibration or shock component of the rate signal 82 may be significant in comparison to the desired Coriolis signal component, causing the outputted rate signal 82 to become saturated. If the signal is sufficiently large, clipping of the charge amplifier 80 and/or other sensing electronics may occur, causing the inertial sensor to output a null signal. Such loss of data, although typically short in duration, can cause errors in the electronics utilized by many guidance systems.

To reduce the effects of external vibration or shock on the gyroscope 10, many prior art gyroscopes attempt to compensate for the motion of the proof masses 12,14 by altering the time-varying and/or amplitude characteristics of the drive voltage $V_D$ and/or by the changing the mechanical characteristics of the proof masses 12,14 and suspension springs 64,68. In some techniques, for example, the mechanical characteristics of the suspension springs 64,68 are modified using a laser trimming process in which portions of the springs 64,68 are removed to alter the resonance characteristics of the proof masses 12,14. Such techniques can increase the cost and complexity of the drive electronics needed to drive the proof masses 12,14, and can increase the number of fabrication steps required during manufacturing. In some cases, such techniques may reduce the ability of the gyroscope 10 to sense and measure subtle variations in rate.

Figure 2:
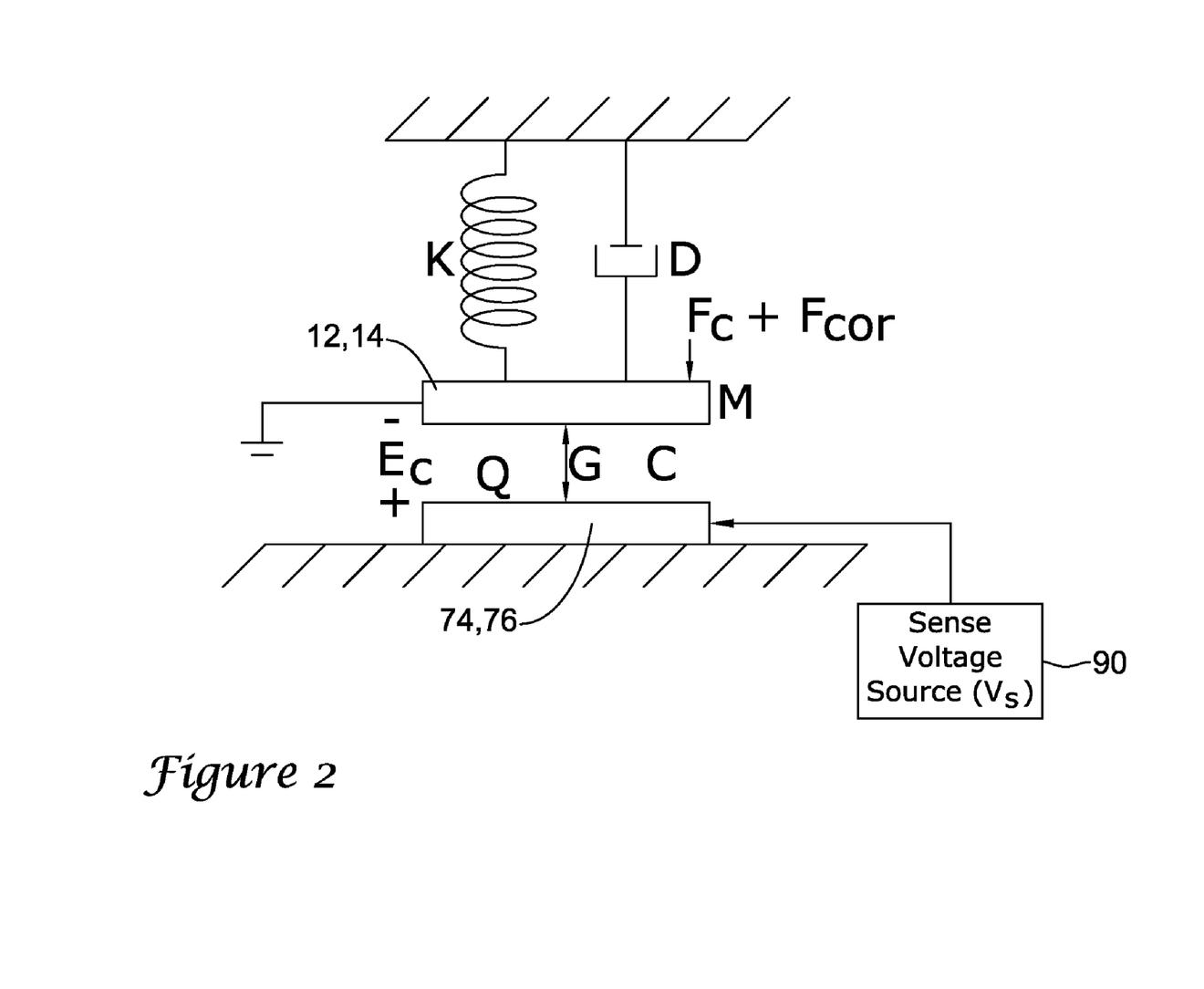
FIG. 2 is a diagrammatic view showing the dampening relationship between the proof masses and respective sense electrodes for the illustrative gyroscope of FIG. 1.

FIG. 2 is a diagrammatic view showing the dampening relationship between the proof masses 12,14 and each respective sense electrode 74,76 for the illustrative gyroscope 10 of FIG. 1. As shown in FIG. 2, each proof mass 12,14 may have a mass M and is connected to mechanical ground through a spring K and a damper D. The spring K and damper D may comprise, for example, the suspension springs 64,68 used to anchor the proof masses 12,14 to the underlying substrate 16 of the gyroscope 10, as discussed herein. As illustrated generally in FIG. 2, each of the proof masses 12,14 is also subjected to a force $F_C$ attributable to the electric field across the gap G between the proof mass 12,14 and respective sense electrode 74,76, and from the Coriolis forces FCOR induced by rotation of the gyroscope 10 about the input axis 18.

A sense bias voltage source 90 can be configured to apply a sense bias voltage $V_S$ signal to the underlying sense electrode 74,76, producing an electric charge Q on each sense electrode 74,76, as shown. Each of the proof masses 12,14 can be maintained at virtual ground via the feedback impedance 86 and capacitor 87 on the charge amplifier 80, producing a capacitance C and gap voltage $E_C$ within the gap G. As discussed herein, the polarity of the sense bias voltage $V_S$ applied to each proof mass 12,14 and respective sense electrode 74,76 can be reversed to prevent the sense bias voltage $V_S$ signal from being injected into the charge amplifier 80.

Figure 3:
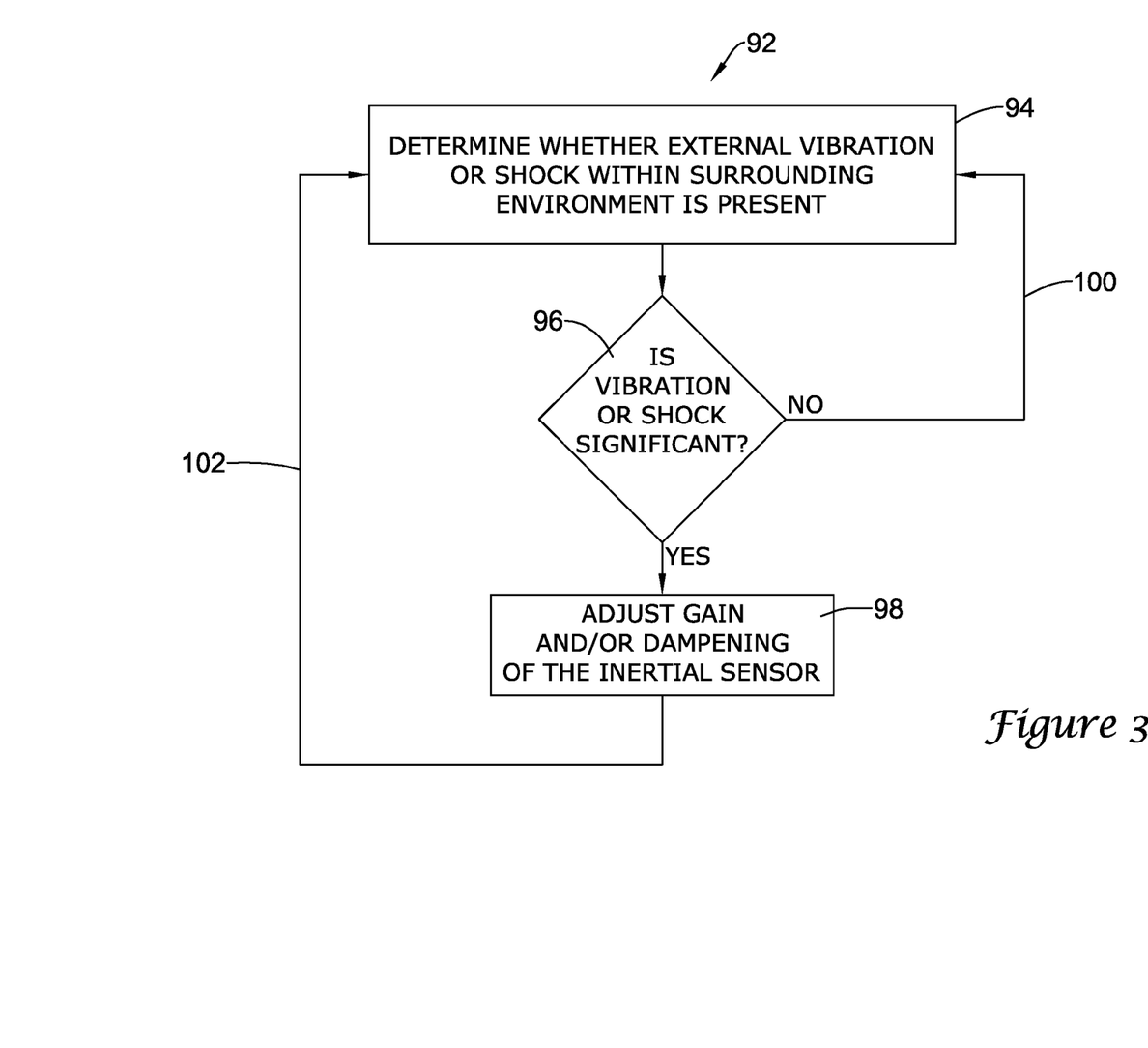
FIG. 3 is a block diagram showing an illustrative method of actively reducing vibration or shock induced errors in an inertial sensor.

Referring now to FIG. 3, a block diagram showing an illustrative method of actively reducing vibration or shock induced errors in an inertial sensor will now be described. The method, depicted generally in FIG. 3 as reference number 92, may begin at 94 with the step of detecting the presence of external vibration or shock within the environment surrounding the inertial sensor. Detection of external vibration or shock within the environment may be accomplished, for example, by monitoring the rate signal outputted from the inertial sensor to determine whether the presently measured rate signal corresponds closely with a previously measured rate signal outputted by the inertial sensor and/or by comparing the rate signal against a known range of acceptable values. A vibration or shock to the inertial sensor, for example, can be detected by comparing the present rate signal outputted by the inertial sensor against a previously measured signal to determine whether a change in the rate signal is within a predetermined acceptable range. In some embodiments, another sensor such as an accelerometer can be utilized to directly sense the presence of external vibration or shock within the environment, if desired.

Upon the detection of a vibration or shock to the inertial sensor, the supervisory electronics for the inertial sensor may then decide whether such vibration or shock is significant to cause errors in the sensor output, as indicated generally by decision block 96. If, for example, it is determined that the vibration or shock is likely to cause errors, the supervisory system for the inertial sensor can be configured to adjust the gain sensitivity of the sensing electronics and/or increase proof mass dampening in order to prevent any signal saturation, as indicated generally with respect to step 98. Otherwise, if it is determined that the vibration or shock is not likely to cause errors in the sensor output, or if adjustment of the gain sensitivity and/or dampening is otherwise undesired, the inertial sensor can be configured to operate in its normal mode without an adjustment to the gain sensitivity of the sense electronics and/or dampening, as shown by arrow 100. As indicated generally by arrow 102, the process of adjusting the sensitivity of the electronics and/or dampening based on the presence of external vibration or shock within the environment can then be repeated one or more times until the shock has ceased, at which point the gain sensitivity and/or dampening can be restored to normal operation.

In certain applications where the external vibration or shock is expected or anticipated at certain time periods during operation, the supervisory electronics for the inertial sensor can be configured to adjust the signal gain of the sense electronics to prevent signal saturation and/or increase sensor damping ahead of the vibration or shock. In navigational applications where canard deployment is often anticipated at certain time periods following a launch, for example, a signal received from the supervisory electronics of the aircraft or missile can be utilized to adjust the sensitivity of the sense electronics for a period of time (e.g. 50 msec) sufficient to dampen the sensor response and avoid clipping. If necessary, any data lost in the time taken to adjust the sensitivity and/or dampening of the inertial sensor could be interpolated by the sense electronics, thus preventing a loss in the rate signal fed to the supervisory electronics for the aircraft or missile.

By adjusting the gain sensitivity of the sense electronics and/or dampening of the proof masses when an external vibration or shock has occurred or is anticipated to occur, the inertial sensor may be able to better avoid signal saturation that can occur when relatively large currents are fed to the sense electronics. In some cases, the ability of the inertial sensor to adjust its gain sensitivity and/or dampening based at least in part on detected and/or anticipated vibration or shock may permit the inertial sensor to operate at higher signal-to-noise ratios during normal operation and at lower signal-to-noise ratios when vibration, shock, or other such noise is present.

Figure 4:
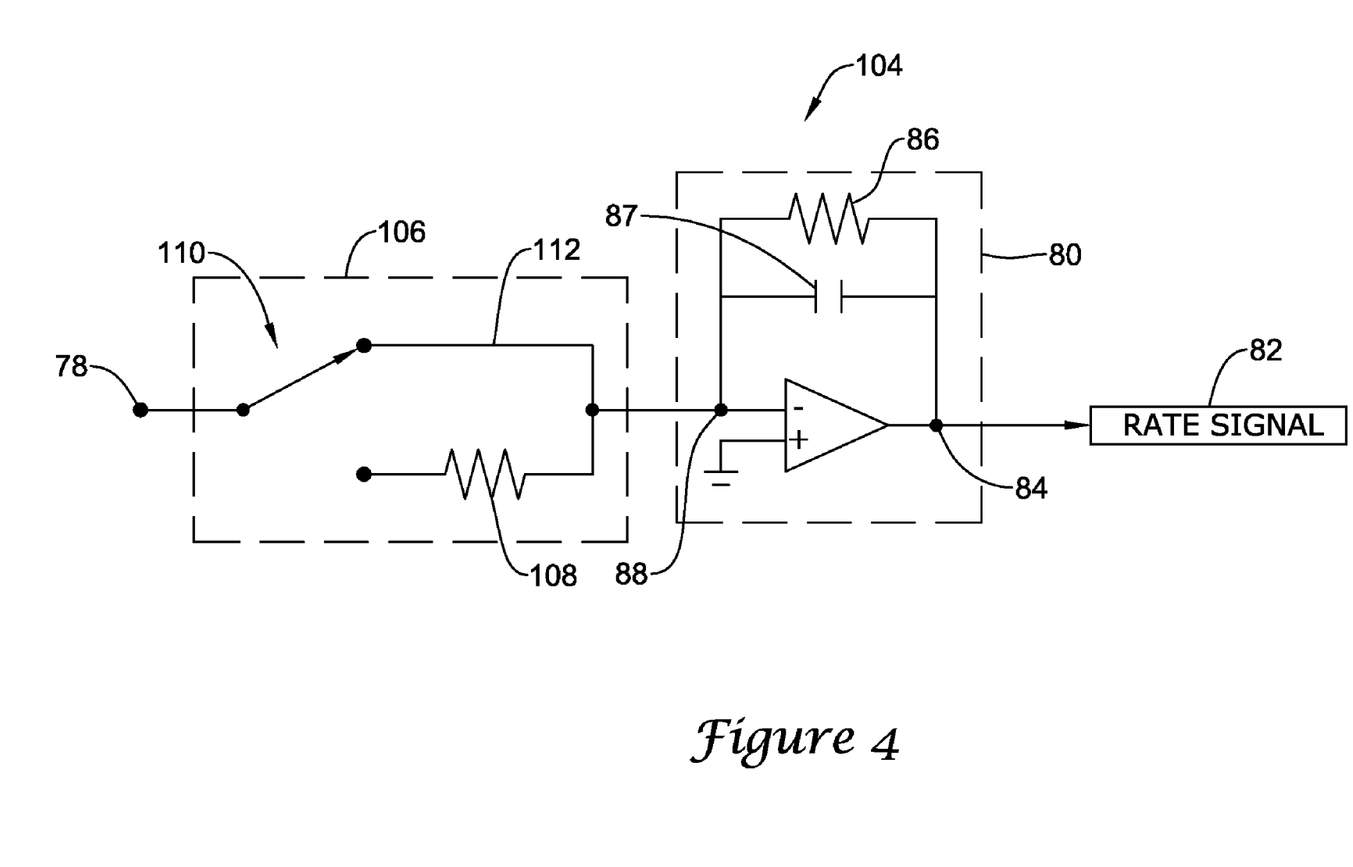
FIG. 4 is a schematic view of an illustrative adaptive circuit for dampening proof mass motion of the illustrative gyroscope of FIG. 1.

Referring now to FIG. 4, an illustrative adaptive circuit 104 for dampening proof mass motion of the illustrative gyroscope 10 of FIG. 1 will now be described. The adaptive circuit 104 may be similar to the sense electronics discussed above with respect to FIG. 1, with like elements labeled in like fashion in the drawings. As shown in FIG. 4, for example, the adaptive circuit 104 may include a charge amplifier 80 having an output node 84, an input node 88, a resistor 86, and a capacitor 87, which as discussed herein, can be utilized to maintain proof masses 12,14 at virtual ground.

The adaptive circuit 104 may further include a dampening switch selector 106 that can be activated to introduce a dampening resistive element 108 in series between the proof masses 12,14 and the charge amplifier 80 to dampen proof mass motion when an external vibration or shock is detected and/or anticipated. In the illustrative embodiment of FIG. 4, the dampening switch selector 106 can include a mechanical or electrical switch 110 that can be activated via the supervisory or sensing electronics to introduce the dampening resistive element 108 into the adaptive circuit 104 and mechanically absorb proof mass energy via heat dissipation. If, for example, an external vibration or shock detected or is anticipated to occur, the switch 110 can be activated to introduce the dampening resistive element 108 into the adaptive circuit 104 to dissipate the excess sense signal current at the proof mass leads 78 to avoid signal saturation or clipping of the charge amplifier 80. Alternatively, if no external vibration or shock is detected or is anticipated to occur, the switch 110 can be configured bypass the dampening resistive element 108 through bypass line 112, allowing the sense signal to be fed directly to the input node 88 of the charge amplifier 80 without any additional dampening of the proof masses 12,14. If desired, any loss of data occurring during activation of the switch 110 between the bypass line 112 and the dampening resistive element 108 can be interpolated by the sense electronics, allowing the gyroscope to operate without a signal loss.

The resistivity value of the dampening resistive element 108 used to dampen proof mass motion can be made sufficient to prevent signal saturation of the charge amplifier 80 while also allowing the desired Coriolis force component of the rate signal 82 to be passed through the amplifier 80. The value of the dampening resistive element 108 will typically vary depending on the nominal dampening characteristics of the proof masses 12,14 and suspension springs 64,68, the magnitude of the sense signal 110, as well as other factors.

In the illustrative embodiment of FIG. 4, the dampening resistive element 108 is shown as a fixed-value resistor which is relatively invariant to changes in resistance under load. It should be understood, however, that other types of resistors can be utilized to dampen proof mass motion, if desired. In some embodiments, for example, the dampening resistive element 108 may include multiple fixed-value resistors each having a different resistivity value that can be used to dampen proof mass motion between a number of different dampening modes. A first, relatively high-value dampening resistor, for example, could be utilized to produce a relatively large amount of proof mass dampening when the external vibration or shock is significant. A second, relatively low-value dampening resistor, in turn, could be used to dampen proof mass motion at a lower level when the external vibration or shock is less significant. Active adjustment of the proof mass dampening may be based on local signal conditions and/or by command of the supervisory system and/or sensing electronics.

Figure 5:
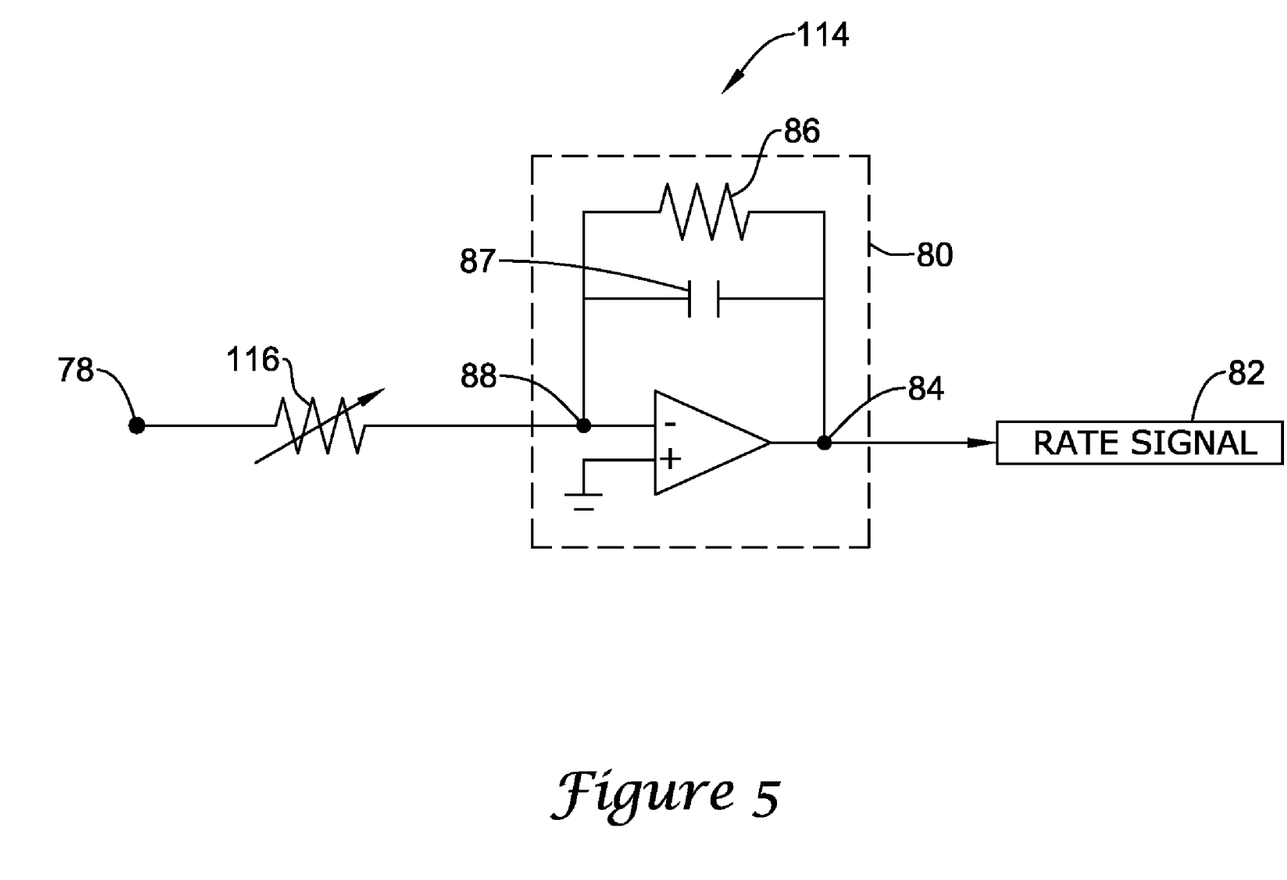
FIG. 5 is a schematic view of another illustrative adaptive circuit for dampening proof mass motion of the illustrative gyroscope of FIG. 1.

FIG. 5 is a schematic view of another illustrative adaptive circuit 114 for dampening proof mass motion of the illustrative gyroscope 10 of FIG. 1. The adaptive circuit 114 may be similar to the sense electronics discussed above with respect to FIG. 1, with like elements labeled in like fashion in the drawings. In the illustrative embodiment of FIG. 5, however, the adaptive circuit 114 may include a variable dampening resistor 116 such as a potentiometer or rheostat that can be utilized to finely adjust the dampening of the proof masses 12,14 when an external vibration or shock to the gyroscope 10 occurs or is anticipated to occur. During operation, the resistivity provided by the variable dampening resistor 116 can be adjusted between an infinite number of positions to alter the amount of proof mass dampening based at least in part on the magnitude of the vibration or shock. The resistance provided by the resistor 116 may also be changed from a high value to a low value via a switch. In some embodiments, the magnitude of the resistance provided by the variable dampening resistor 116 will be in proportion to the magnitude of the external vibration or shock present. In other embodiments, the magnitude of the resistance provided by the variable dampening resistor 116 may vary in a non-linear manner depending on the characteristics of the vibration or shock, the mechanical characteristics of the proof masses 12,14 and suspension springs 64,68, as well as other factors.

Figure 6:
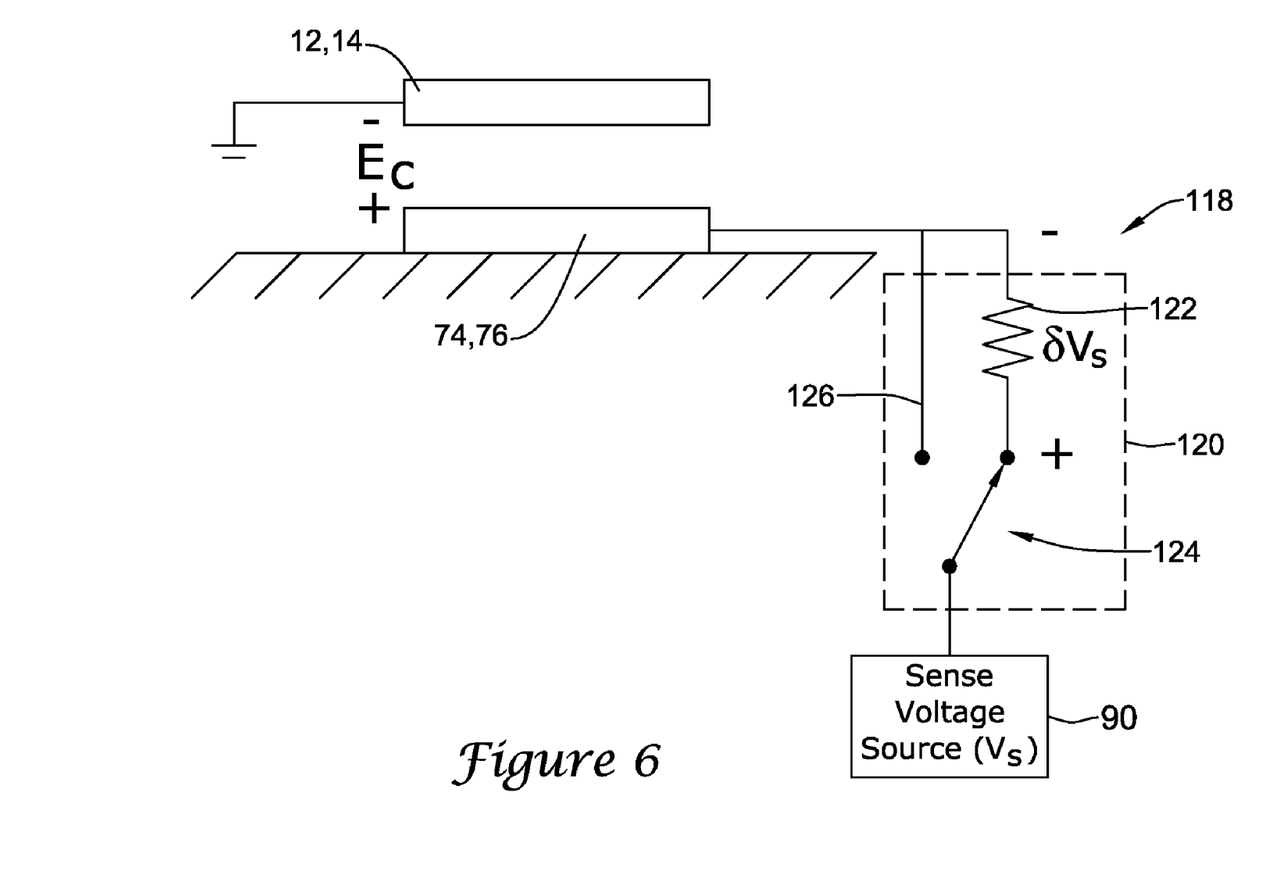
FIG. 6 is a schematic view of another illustrative adaptive circuit for dampening proof mass motion of the illustrative gyroscope of FIG. 1.

In some embodiments, the value of the variable dampening resistor 116 can be adjusted ahead of an anticipated vibration or shock, allowing the adaptive circuit 114 to temporarily limit the current fed to the charge amplifier 80 to prevent signal saturation or clipping from occurring. If, for example, an external vibration or shock is anticipated to occur, the adaptive circuit 114 can be configured to increase the amount of dampening by increasing the resistivity of the variable dampening resistor 116 just prior to the period of vibration or shock. Alternatively, if no vibration or shock is anticipated or if compensation is undesired, the variable dampening resistor 116 can be configured to provide little or no resistivity, allowing the gyroscope 10 to operate in its normal mode without an adjustment to the nominal dampening of the proof masses 12,14, FIG. 6 is a schematic view showing another illustrative adaptive circuit 118 for dampening proof mass motion of the illustrative gyroscope 10 of FIG. 1. As shown in FIG. 6, dampening of the proof masses 12,14 can be accomplished using a dampening switch selector 120 that can be activated to introduce a dampening resistive element 122 in series between each of the sense electrodes 74,76 and the sense bias voltage source 90 to dampen proof mass motion when an external vibration or shock is detected and/or anticipated. In the illustrative embodiment of FIG. 6, the dampening switch selector 120 can include a mechanical or electrical switch 124 that can be activated via the supervisory or sensing electronics to introduce the dampening resistive element 122 into the adaptive circuit 118 and mechanically absorb proof mass energy via heat dissipation. If, for example, an external vibration or shock is detected or is anticipated to occur, the switch 124 can be activated to introduce the dampening resistive element 122 into the adaptive circuit 118, forming a voltage differential $\delta V_S$ across the element 122 that dissipates some of the charge delivered to each of the sense plates 74,76. Alternatively, if no external vibration or shock exists or is anticipated to occur, the switch 124 can be configured to bypass the dampening resistive element 122 through bypass line 126 without altering the nominal dampening of the proof masses 12,14.

During operation, the value of dampening resistive element 122 can be configured to provide sufficient dampening to the proof masses 12,14 to prevent signal saturation or clipping from occurring in the sense electronics while also allowing the desired Coriolis force component of the rate signal 82 to be measured. If desired, any loss of data occurring during activation of the switch 124 between the bypass line 126 and the dampening resistive element 122 can be interpolated by the sense electronics, allowing the gyroscope 10 to operate without a signal loss.

In the illustrative embodiment of FIG. 6, the dampening resistive element 122 is shown as a fixed-value resistor which is relatively invariant to changes in resistance under load. It should be understood, however, the dampening resistive element 122 can employ other types and/or numbers of resistive elements to dampen proof mass motion, if desired. In some embodiments, for example, the dampening resistive element 122 may include multiple fixed-value resistors each having a different resistivity value that can be used to dampen proof mass motion between a number of different dampening modes. As discussed herein, adjustment of the proof mass dampening may be based on local signal conditions and/or by command of the supervisory system and/or sensing electronics.

Figure 7:
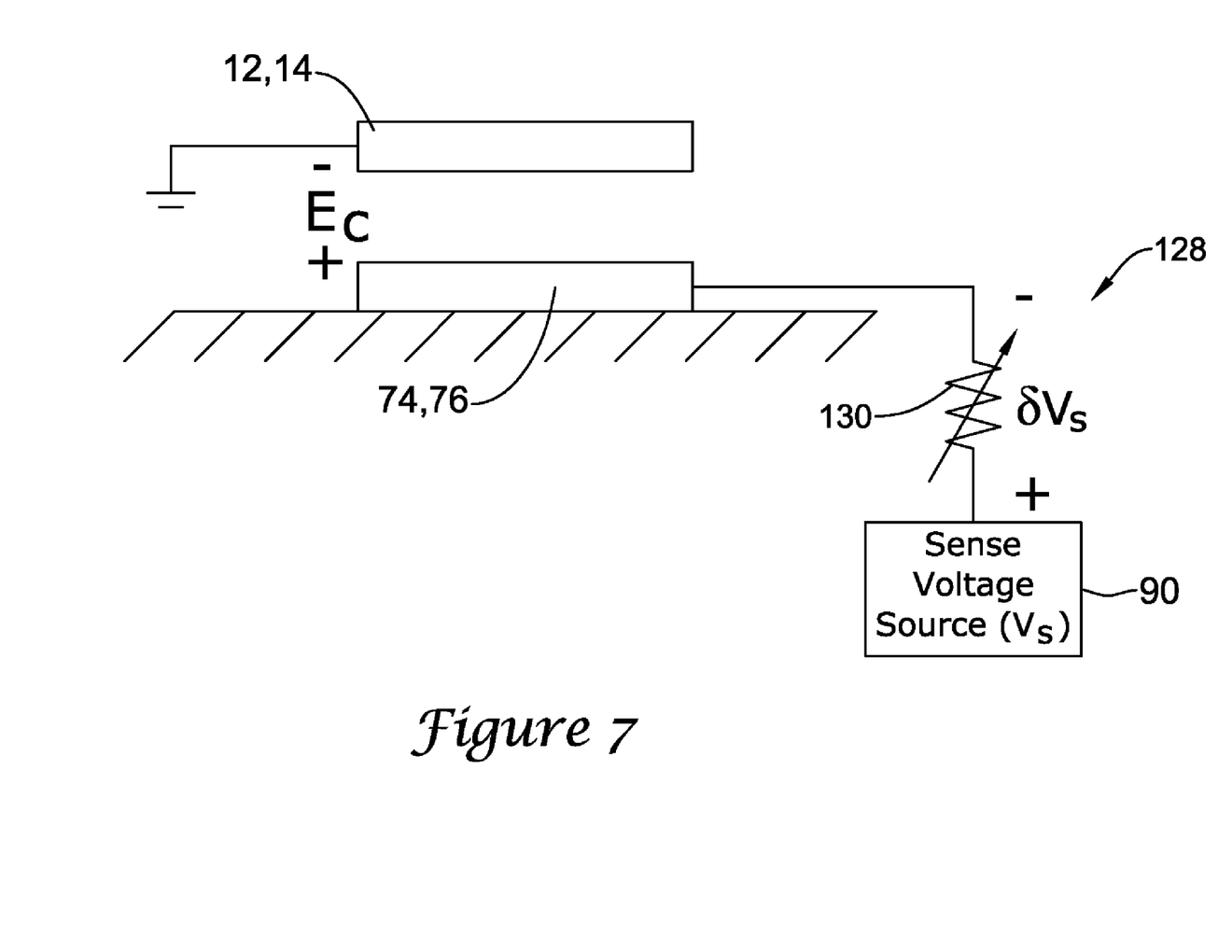
FIG. 7 is a schematic view of another illustrative adaptive circuit for dampening proof mass motion of the illustrative gyroscope of FIG. 1.

FIG. 7 is a schematic view of another illustrative adaptive circuit 128 for dampening proof mass motion of the illustrative gyroscope 10 of FIG. 1. In the illustrative embodiment of FIG. 7, the adaptive circuit 128 may include a variable dampening resistor 130 such as a potentiometer or rheostat that can be utilized to finely dampen the proof masses 12,14 when an external vibration or shock to the gyroscope occurs or is anticipated to occur. During operation, the resistivity provided by the variable dampening resistor 130 can be adjusted between an infinite number of positions to alter the amount of proof mass dampening based at least in part on the magnitude of the vibration or shock. The resistance provided by the resistor 130 may also be changed from a high value to a low value via a switch. In some embodiments, the magnitude of the resistance provided by the variable dampening resistor 130 will be in proportion to the magnitude of the external vibration or shock present. In other embodiments, the magnitude of the resistance provided by the variable dampening resistor 130 may vary in a non-linear manner. If desired, the variable dampening resistor 130 can be adjusted ahead of an anticipated vibration or shock, allowing the adaptive circuit 128 to temporarily dampen proof mass motion just prior to the period of vibration or shock.

Figure 8:
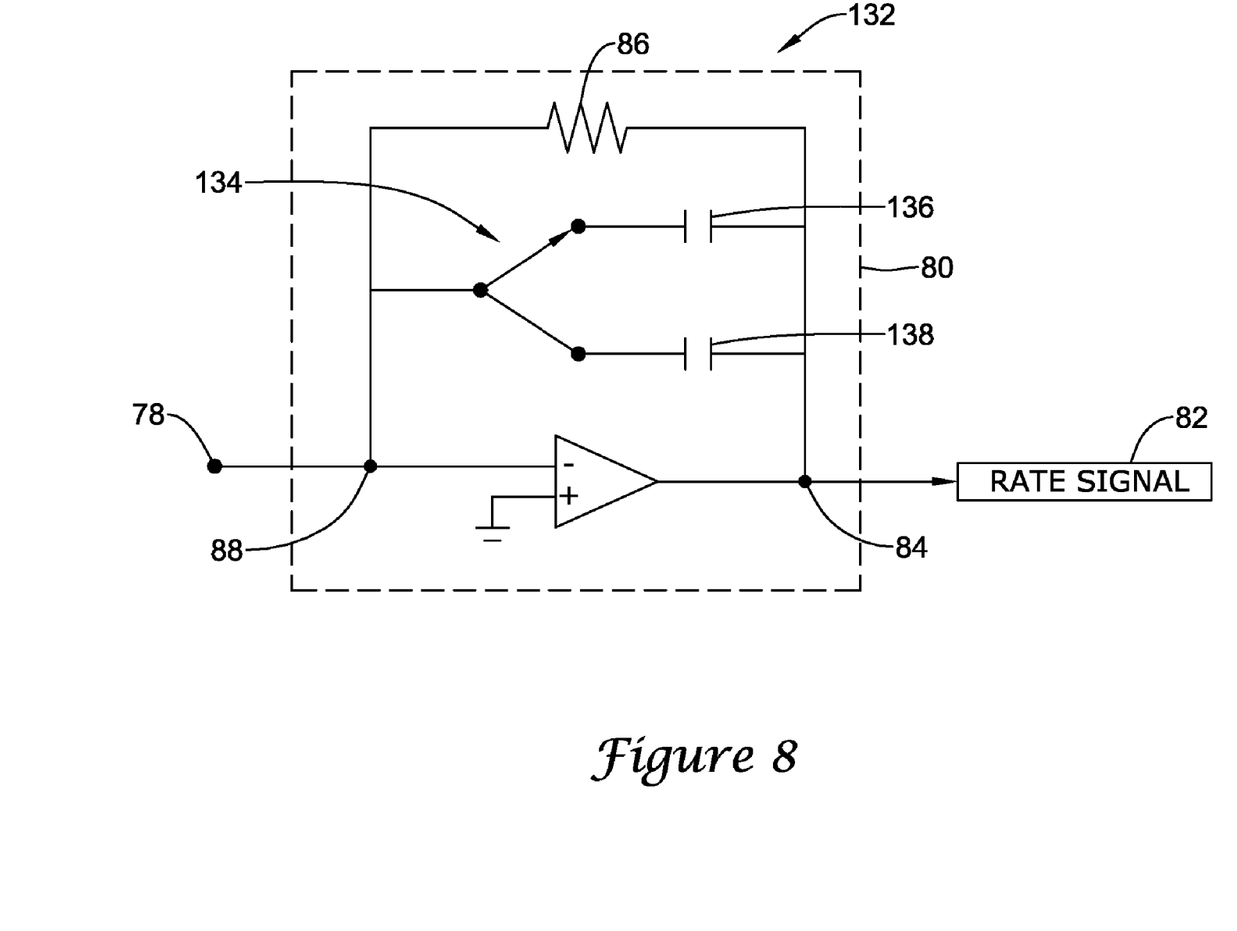
FIG. 8 is a schematic view of an illustrative adaptive circuit for adjusting the gain sensitivity of the sense electronics for the illustrative gyroscope of FIG. 1.

FIG. 8 is a schematic view of an illustrative adaptive circuit 132 for adjusting the gain sensitivity of the sense electronics for the illustrative gyroscope 10 of FIG. 1. As shown in the illustrative embodiment of FIG. 8, the charge amplifier 80 used to convert charge signals, or currents, received from the first and second proof masses 12,14 into a corresponding rate signal 82 can further include a mechanical or electrical gain selection switch 134 that can be used to select between two feedback capacitors 136,138 each having a different capacitance from each other to adjust the gain sensitivity (i.e. signal-to-noise ratio) when an external vibration or shock is detected or is anticipated. A first feedback capacitor 136, for example, may have a relatively high capacitance that acts to reduce the gain sensitivity of the charge amplifier 80 when an external vibration or shock is detected or is anticipated. A second feedback capacitor 138, in turn, may have a relatively low capacitance to permit the charge amplifier 80 to operate at an increased sensitivity during normal operation when vibration or shock is not present. The values of the first and second feedback capacitors 136,138 can be selected to permit the gyroscope 10 to operate at a relatively high SNR ratios during periods of no vibration or shock, and at a lower SNR ratios during periods of vibration or shock sufficient to prevent signal saturation or clipping. If desired, any loss of data occurring during switching can be interpolated by the sensing electronics, allowing the system to operate without a signal loss.

In some embodiments, a charge amplifier having multiple channels each operating at different gain sensitivities can be utilized to output two separate rate signals to compensate for external vibration or shock on the gyroscope 10 without switching. In one such embodiment depicted in FIG. 9, for example, an adaptive circuit 140 may include a multiple-channel charge amplifier 142 having a first amplifier channel 144 for producing a first rate signal 146 having a relatively high SNR ratio, and a second amplifier channel 148 for producing a second rate signal 150 in parallel with the first rate signal 146 having a relatively low SNR ratio.

Figure 9:
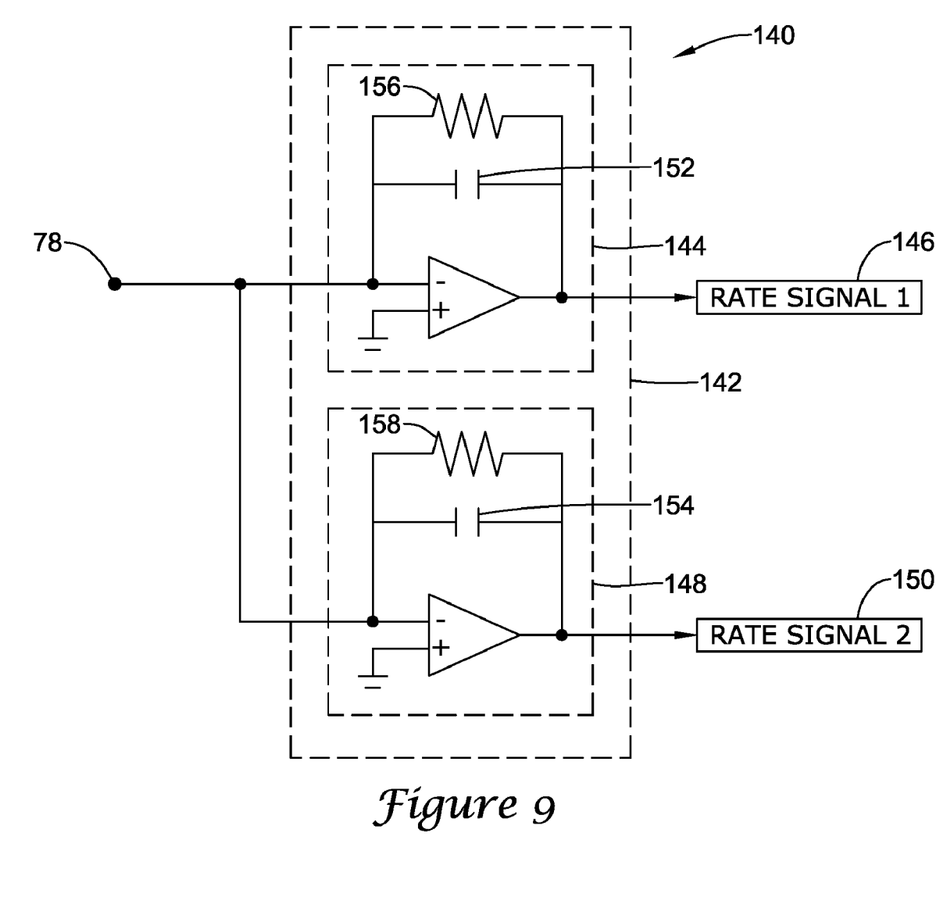
FIG. 9 is a schematic view of another illustrative adaptive circuit for adjusting the gain sensitivity of the sense electronics for the illustrative gyroscope of FIG. 1.

During normal operation when no external vibration or shock is present within the environment, the sense electronics for the gyroscope can be configured to use the first rate signal 146 with the higher gain sensitivity to permit subtle variables in rate to be measured and outputted by the gyroscope. In the event external vibration or shock is detected and/or anticipated, however, the sense electronics can be configured to use the second rate signal 150 with the lower gain sensitivity in order to continue to measure gyroscopic movement during the period of vibration or shock. Because the charge amplifier 142 is capable of outputting two simultaneous rate signals 146,150 in tandem with each other, the adaptive circuit 140 may permit the gyroscope to quickly switch back and forth between rate signals 146,150 to avoid signal saturation of the sensing electronics. In some cases, such configuration may permit the sensing electronics to quickly change between amplifier channels 144,148 with no loss of data.

The gain sensitivities of each amplifier channel 144,148 can be varied based on the values of the feedback capacitor 152,154 and of the resistors 156,158 used to maintain the proof masses 12,14 at virtual ground. In some embodiments, for example, the first amplifier channel 144 may have a relatively low value feedback capacitor 152 between the output and input nodes of the charge amplifier 142 to output a rate signal 146 having an increased gain sensitivity during normal operation where no vibration or shock is present. In contrast, the second charge amplifier channel 148 may have a relatively high value feedback capacitor 154 between the output and input nodes of the charge amplifier 142 to output a rate signal 150 having a decreased gain sensitivity when external vibration or shock is present.

While the illustrative embodiment shown in FIG. 9 employs a single charge amplifier 142 having two parallel amplifier channels 144,148 capable of outputting two separate (i.e. parallel) rate signals 146,150, it should be understood that multiple amplifiers could be utilized to output multiple rate signals, if desired. In addition, while only two rate signals are shown outputted by the illustrative charge amplifier 142 of FIG. 9, it should be understood that additional amplifier channels and/or amplifiers could be utilized to output additional rate signals, each having a different gain sensitivity that can be used to tune the signal-to-noise ratio of the sensor output between a number of other sensitivity modes, if desired.

Figure 10:
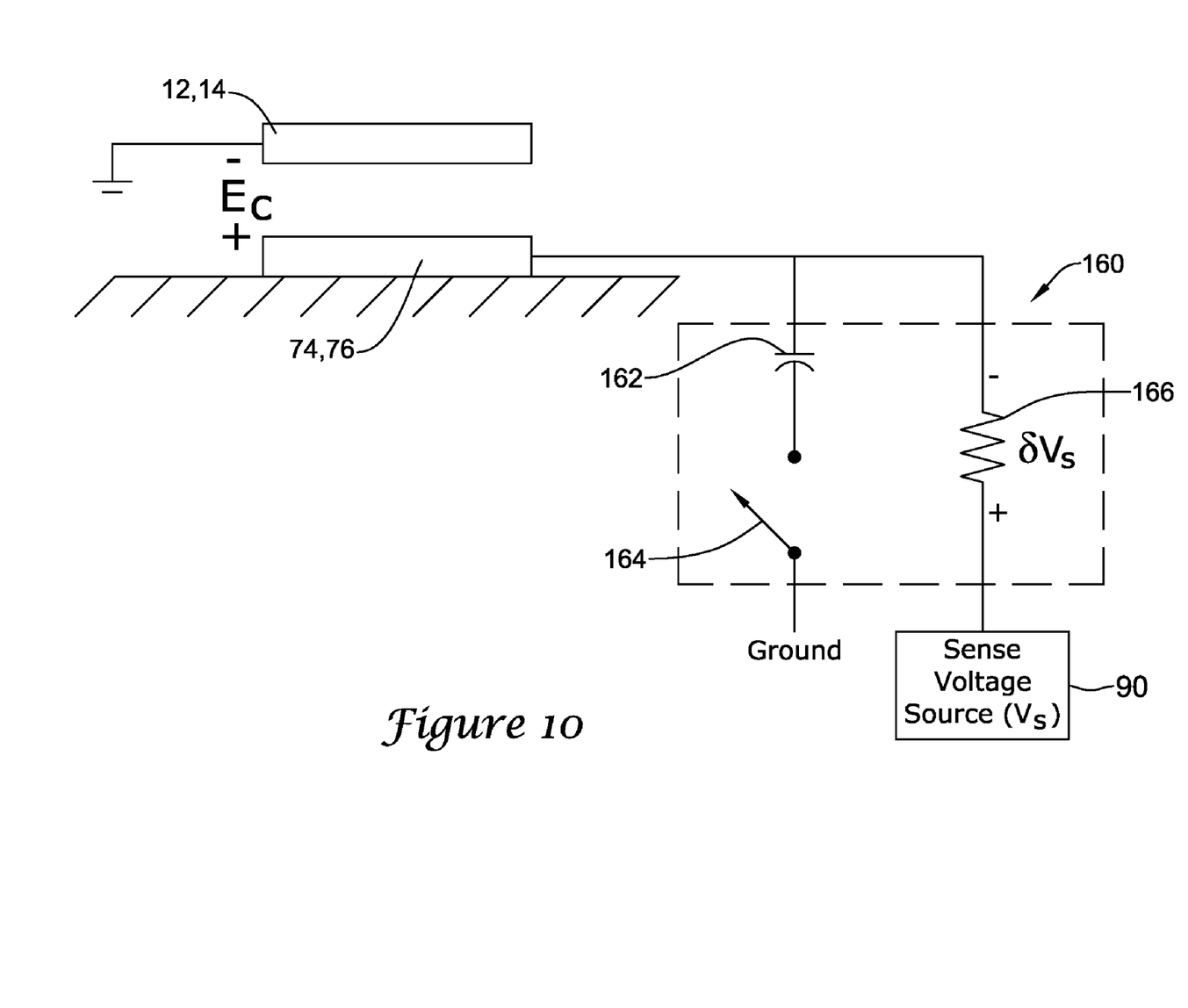
FIG. 10 is a schematic view of another illustrative adaptive circuit for dampening proof mass motion of the illustrative gyroscope of FIG. 1.

FIG. 10 is a schematic view of another illustrative adaptive circuit 160 for dampening proof mass motion of the illustrative gyroscope 10 of FIG. 1. In the illustrative embodiment of FIG. 10, the adaptive circuit 160 may include a capacitor 162 that can be used to stabilize the voltage supplied to the electrodes 74,76 by activating a switch 164 connected to ground. A dampening resistor 166 of the adaptive circuit 160, in turn, is connected directly to the sense voltage bias source 90. During normal operation, the switch 164 can be closed, introducing the capacitor 162 into the adaptive circuit 160 to stabilize the voltage supplied to the electrodes 74,76. When vibration or shock is anticipated or sensed, however, the switch 164 can be configured to open so that the capacitor 162 is not longer connected to ground. When this occurs, the motion of the proof masses 12,14 is dampened due to the resistivity supplied to the electrodes 74,76 via the dampening resistor 166, thus providing sufficient dampening to the proof masses 12,14 to prevent signal saturation or clipping from occurring in the sense electronics.

Figure 11:
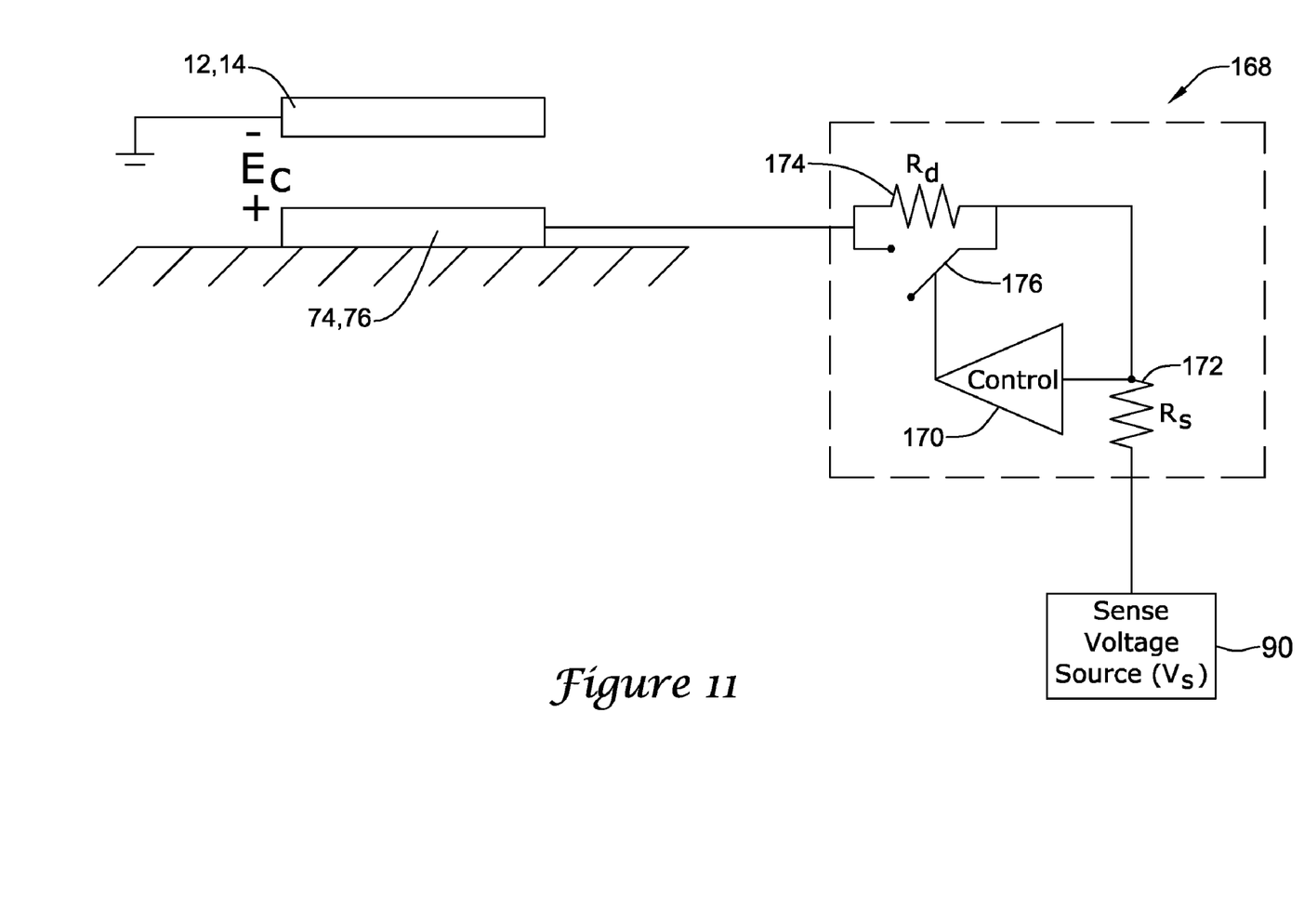
FIG. 11 is a schematic view of another illustrative adaptive circuit for dampening proof mass motion of the illustrative gyroscope of FIG. 1.

FIG. 11 is a schematic view of another illustrative adaptive circuit 168 for dampening proof mass motion of the illustrative gyroscope 10 of FIG. 1. In the illustrative embodiment of FIG. 11, the adaptive circuit 168 varies the amount of dampening provided to the electrodes 74,76 via a controller 170, which can be configured to directly detect the amount of proof mass motion and apply dampening when vibration or shock is anticipated and/or sensed. A relatively small-value sense resistor ($R_S$) 172 connected to the sense voltage source $V_S$ can be used by the controller 170 to sense fluctuations in the voltage delivered to the electrodes 74,76 resulting from vibrational motion of the proof masses 12,14. A relatively large-value dampening resistor ($R_D$) 174, in turn, can be introduced into the adaptive circuit 168 via a switch 176, allowing the controller 170 to selectively switch in the dampening resistor 174 when an event is detected by the sense resistor 172, or when a vibration or shock is anticipated to occur.

During normal operation, the switch 176 can be opened so that only the sense resistor 172 is applied to the electrodes 74,76, which, based on its relatively low value, does not significantly dampen the proof mass 12,14. When a vibration, shock, or other such event is anticipated and/or sensed, however, the controller 170 can be configured to switch in the dampening resistor 174 in order to reduce motion of the proof masses 12,14. Such activation of the switch 176 may occur, for example, when natural saturation occurs in the sensing system used to sense proof mass motion, or when some other event occurs in which proof mass dampening is desired. Once the current through the sense resistor 172 is small again indicating that the event has subsided, the controller 170 can be configured to again close the switch 176, thus bypassing the dampening resistor 174 and removing the dampening applied to the proof masses 12,14.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. An adaptive circuit for reducing vibration or shock induced errors in an inertial sensor, the inertial sensor including at least one proof mass at least one and sense electrode for sensing rotational motion of the sensor about a rate axis, the adaptive circuit comprising:

a sense bias voltage source electrically connected to the at least one sense electrode and adapted to produce a charge on a corresponding proof mass of the at least one proof mass based at least in part on the rotational motion of the inertial sensor about the rate axis;

at least one amplifier electrically connected to the at least one proof mass and adapted to output a rate signal based at least in part on the charge produced on the at least one proof mass;

a means for detecting and/or anticipating the external vibration or shock on the inertial sensor; and a dampening resistive element adapted to dampen proof mass motion in response to the external vibration or shock on the inertial sensor, further comprising a dampening switch selector adapted to selectively switch-in the dampening resistive element and dampen proof mass motion when the external vibration or shock is detected and/or anticipated.

2. The adaptive circuit of claim 1, wherein said means for detecting and/or anticipating an external vibration or shock on the inertial sensor includes a signal or command from a sensor.

3. The adaptive circuit of claim 1, wherein said means for detecting and/or anticipating an external vibration or shock on the inertial sensor includes a signal or command from a supervisory system of the inertial sensor.

4. The adaptive circuit of claim 1, wherein said dampening resistive element is a fixed-value resistor.

5. The adaptive circuit of claim 1, wherein said dampening resistive element includes a plurality of fixed-value resistors, and wherein said dampening switch selector is adapted to selectively switch-in one or more of said plurality of fixed-value resistors based at least in part on the magnitude of the external vibration or shock detected and/or anticipated.

6. The adaptive circuit of claim 1, wherein said dampening resistive element is a variable resistor adapted to vary in resistivity based at least in part on the magnitude of the external vibration or shock detected and/or anticipated.

7. The adaptive circuit of claim 1, wherein the dampening resistive element is disposed in series between the at least one proof mass and the at least one amplifier.

8. The adaptive circuit of claim 1, wherein said inertial sensor is a gyroscope.

9. An adaptive circuit for reducing vibration or shock induced errors in an inertial sensor, the inertial sensor including at least one proof mass at least one and sense electrode for sensing rotational motion of the sensor about a rate axis, the adaptive circuit comprising:
   a sense bias voltage source electrically connected to the at least one sense electrode and adapted to produce a charge on a corresponding proof mass of the at least one proof mass based at least in part on the rotational motion of the inertial sensor about the rate axis;
   at least one amplifier electrically connected to the at least one proof mass and adapted to output a rate signal based at least in part on the charge produced on the at least one proof mass;
   a means for detecting and/or anticipating the external vibration or shock on the inertial sensor; and
   a dampening resistive element adapted to dampen proof mass motion in response to the external vibration or shock on the inertial sensor, wherein the dampening resistive element is disposed in series between the at least one sense electrode and the sense bias voltage source.

10. The adaptive circuit of claim 9, further comprising a switch capacitor adapted to stabilize the sense bias voltage source supplied to the at least one sense electrode.

11. The adaptive circuit of claim 9, farther comprising a controller adapted to selectively switch-in the dampening resistive element and dampen proof mass motion based at least in part current flow through a sense resistor connected to the sense bias voltage source.

12. A method of actively reducing vibration or shock induced errors in an inertial sensor operating within an environment, the inertial sensor including at least one proof mass and at least one sense electrode for sensing rotational motion of the sensor about a rate axis, the method comprising the steps of:
   connecting a sense bias voltage source to the at least one sense electrode and producing a charge on a corresponding proof mass of the at least one proof mass based at least in part on the rotational motion of the inertial sensor about the rate axis;
   connecting an amplifier to the at least one proof mass and outputting a rate signal based at least in part on the charge produced on the at least one proof mass;
   detecting and/or anticipating an external vibration or shock within the environment; and
   adjusting the dampening of the at least one proof mass based at least in part on the detected and/or anticipated vibration or shock within the environment, wherein said step of adjusting the dampening of the at least one proof mass includes the steps of:
   selectively switching-in a dampening resistive element in series between the at least one sense electrode and the sense bias voltage source; and
   dampening the at least one proof mass in response to the vibration or shock within the environment.

13. The method of claim 12, wherein said step of adjusting the dampening of the at least one proof mass includes the steps of:
   selectively switching-in a dampening resistive element in series between the at least one proof mass and the amplifier; and
   dampening the at least one proof mass in response to the vibration or shock within the environment.

* * * * *